United States Patent
Afsari et al.

(10) Patent No.: US 7,351,929 B2
(45) Date of Patent: Apr. 1, 2008

(54) METHOD OF AND APPARATUS FOR HIGH SPEED, HIGH QUALITY, CONTAMINANT REMOVAL AND COLOR SORTING OF GLASS CULLET

(75) Inventors: Farook Afsari, Menlo Park, CA (US); Jerry Samuel Dimsdale, Oakland, CA (US)

(73) Assignee: eCullet, Menlo Park, CA (US)

( * ) Notice: Subject to any disclaimer, the term of this patent is extended or adjusted under 35 U.S.C. 154(b) by 520 days.

(21) Appl. No.: 10/877,531

(22) Filed: Jun. 24, 2004

(65) Prior Publication Data

US 2004/0251178 A1    Dec. 16, 2004

Related U.S. Application Data (63) Continuation-in-part of application No. 10/637,188, filed on Aug. 8, 2003.

(60) Provisional application No. 60/493,297, filed on Aug. 6, 2003, provisional application No. 60/403,297, filed on Aug. 12, 2002.

(51) Int. Cl.
    B07C 5/342    (2006.01)
(52) U.S. Cl. ......... 209/580; 209/588; 209/644
(58) Field of Classification Search ......... 209/576, 209/577, 580, 581, 582, 588, 587, 643, 644, 209/932
    See application file for complete search history.

(56) References Cited

U.S. PATENT DOCUMENTS

| | | | | |
|---|---|---|---|---|
| 2,627,975 A | | 2/1953 | Ekstrom et al. | 209/111 |
| 3,351,198 A | | 11/1967 | Wyman et al. | 209/111.6 |
| 3,489,277 A | * | 1/1970 | Silverman | 209/587 |
| 3,650,396 A | | 3/1972 | Gillespie et al. | 209/3 |
| 3,802,558 A | | 4/1974 | Rhys | 209/75 |

(Continued)

FOREIGN PATENT DOCUMENTS

DE    3828067 A1    2/1990

(Continued)

OTHER PUBLICATIONS

"Classical Imaging and Digital Imaging Spectrophotometric Techniques in Cullets (Glass Fragments) Sorting" by Giuseppe Bonifazi, University of Rome, Italy, pp. 264-277.

*Primary Examiner*—Patrick Mackey
*Assistant Examiner*—Mark Hageman
(74) *Attorney, Agent, or Firm*—Haverstock & Owens LLP (57) ABSTRACT

A system for sorting a mixed stream of different colored cullet into separate groups of same colored cullet comprises a light emitting source for transmitting light, such as white light, through a cullet, and a camera having a plurality of pixels for receiving light transmitted through the cullet or detecting the absence of light blocked by an opaque contaminant, the camera providing at least one value from the light received, wherein the cullet moves along a designated path based on the at least one value. The camera collects the received light at a desired sampling interval and a circuit converts the values into digital representation values. The circuit calculates a non-linear function from the digital representation values. An electrostatic or fluid driving actuator directs the cullet along a deflected path based on a value of the non-linear function. A vibratory feeder provides the cullet onto a conveyer belt having an exit roller of a desired diameter.

32 Claims, 7 Drawing Sheets

U.S. PATENT DOCUMENTS

| | | | |
|---|---|---|---|
| 3,897,330 A | 7/1975 | Rhys | 209/75 |
| 3,980,180 A | 9/1976 | Jamieson | 209/111.6 |
| 4,076,979 A | 2/1978 | Walter et al. | 250/226 |
| 4,131,540 A | 12/1978 | Husome et al. | 209/582 |
| 4,230,558 A * | 10/1980 | Fulwyler | 209/3.1 |
| 4,276,983 A | 7/1981 | Witmer | 209/587 |
| 4,278,538 A | 7/1981 | Lawrence et al. | 209/580 |
| 4,352,430 A | 10/1982 | Maier et al. | 209/577 |
| 4,379,525 A | 4/1983 | Nowicki et al. | 241/20 |
| 4,583,695 A | 4/1986 | Genestie | 241/24 |
| 4,584,455 A | 4/1986 | Tomizawa | 219/121 |
| 4,630,736 A | 12/1986 | Maughan et al. | 209/587 |
| 4,657,144 A | 4/1987 | Martin et al. | 209/546 |
| 4,699,273 A | 10/1987 | Suggi-Liverani et al. | 209/580 |
| 4,699,510 A | 10/1987 | Alguard | 356/73 |
| 4,765,489 A | 8/1988 | Satake | 209/557 |
| 4,863,041 A | 9/1989 | Bailey | 209/580 |
| 4,915,825 A | 4/1990 | Christie et al. | 209/166 |
| 4,919,534 A | 4/1990 | Reed | 356/73 |
| 4,951,825 A | 8/1990 | Hawkins et al. | 209/558 |
| 4,976,356 A * | 12/1990 | Mizuno et al. | 209/539 |
| 5,021,645 A | 6/1991 | Satula et al. | 250/223 |
| 5,085,325 A | 2/1992 | Jones et al. | 209/580 |
| 5,143,308 A | 9/1992 | Hally et al. | 241/76 |
| 5,148,923 A | 9/1992 | Fraenkel et al. | 209/539 |
| 5,148,993 A | 9/1992 | Kashiwagi | 241/24 |
| 5,150,307 A | 9/1992 | McCourt et al. | 364/478 |
| 5,156,278 A | 10/1992 | Aaron et al. | 209/556 |
| 5,215,772 A | 6/1993 | Roth | 426/231 |
| 5,314,071 A * | 5/1994 | Christian et al. | 209/4 |
| 5,314,072 A | 5/1994 | Frankel et al. | 209/44.1 |
| 5,315,384 A | 5/1994 | Heffington et al. | 348/93 |
| 5,318,172 A | 6/1994 | Kenny et al. | 209/524 |
| 5,333,739 A | 8/1994 | Stelte | 209/582 |
| 5,335,791 A | 8/1994 | Eason | 209/588 |
| 5,339,963 A | 8/1994 | Tao | 209/581 |
| 5,350,118 A | 9/1994 | Mitchell et al. | 239/551 |
| 5,398,818 A | 3/1995 | McGarvey | 209/580 |
| 5,402,264 A | 3/1995 | Wilbur et al. | 359/508 |
| 5,419,438 A | 5/1995 | Squyres et al. | 209/3.1 |
| 5,440,127 A | 8/1995 | Squyres | 250/341.8 |
| 5,443,164 A | 8/1995 | Walsh et al. | 209/580 |
| 5,456,127 A | 10/1995 | Gschweitl | 73/866 |
| 5,464,981 A | 11/1995 | Squyres et al. | 250/341.8 |
| 5,469,973 A | 11/1995 | Booth et al. | 209/580 |
| 5,481,864 A | 1/1996 | Wright | 57/400 |
| 5,483,057 A | 1/1996 | Gross et al. | 250/226 |
| 5,501,344 A | 3/1996 | Kaiser et al. | 209/578 |
| 5,512,758 A | 4/1996 | Kobayashi et al. | 250/461.1 |
| 5,531,331 A | 7/1996 | Barnett | 209/580 |
| 5,533,628 A | 7/1996 | Tao | 209/580 |
| 5,555,984 A * | 9/1996 | Sommer et al. | 209/580 |
| 5,590,791 A | 1/1997 | Gschweitl | 209/577 |
| 5,632,381 A | 5/1997 | Thust et al. | 209/44.1 |
| 5,675,416 A | 10/1997 | Campbell et al. | 356/367 |
| 5,782,364 A | 7/1998 | Macenka | 209/643 |
| 5,789,741 A | 8/1998 | Kinter et al. | 250/226 |
| 5,794,788 A | 8/1998 | Massen | 209/524 |
| 5,799,105 A | 8/1998 | Tao | 382/167 |
| 5,813,542 A | 9/1998 | Cohn | 209/581 |
| 5,848,706 A | 12/1998 | Harris | 209/580 |
| 5,862,919 A * | 1/1999 | Eason | 209/577 |
| 5,884,775 A | 3/1999 | Campbell | 209/581 |
| 5,894,938 A | 4/1999 | Ichise et al. | 209/559 |
| 5,895,910 A | 4/1999 | Christian | 250/208.2 |
| 5,913,427 A | 6/1999 | Gschweitl | 209/10 |
| 5,954,206 A | 9/1999 | Mallon et al. | 209/580 |
| 5,966,217 A | 10/1999 | Roe et al. | 356/402 |
| 5,979,240 A | 11/1999 | Rix et al. | 73/602 |
| 6,011,229 A * | 1/2000 | Geisler et al. | 209/127.4 |
| 6,112,903 A | 9/2000 | Kimmel et al. | 209/11 |
| 6,137,074 A | 10/2000 | Doak | 209/581 |
| 6,144,004 A | 11/2000 | Doak | 209/581 |
| 6,260,712 B1 * | 7/2001 | Flottmann et al. | 209/639 |
| 6,265,683 B1 * | 7/2001 | Flottmann et al. | 209/576 |
| 6,313,422 B1 | 11/2001 | Anibus | 209/580 |
| 6,504,124 B1 * | 1/2003 | Doak | 209/581 |
| 6,506,991 B1 * | 1/2003 | Eixelberger et al. | 209/581 |
| 2004/0035763 A1 | 2/2004 | Kokko | |

FOREIGN PATENT DOCUMENTS

| | | |
|---|---|---|
| EP | 0 426 893 A1 | 11/1989 |
| EP | 0 461 616 A2 | 6/1991 |
| JP | 59-183340 | 10/1984 |

* cited by examiner

Fig. 5

METHOD OF AND APPARATUS FOR HIGH SPEED, HIGH QUALITY, CONTAMINANT REMOVAL AND COLOR SORTING OF GLASS CULLET

RELATED APPLICATION

This Patent Application is a continuation-in-part of co-pending patent application Ser. No. 10/637,188, filed Aug. 8, 2003, entitled "METHOD OF AND APPARATUS FOR MULTI-STAGE SORTING OF GLASS CULLETS" which claims priority under 35 U.S.C. 119(e) of the U.S. Provisional Patent Application, Ser. No. 60/403,297 filed Aug. 12, 2002, and entitled "GLASS SORTER", both of which are hereby incorporated by reference. This Patent Application also claims priority under 35 U.S.C. 119(e) to the co-pending U.S. Provisional Patent Application, Ser. No. 60/493,297, filed Aug. 6, 2003, and entitled "GLASS SORTER", which is hereby incorporated by reference.

FIELD OF THE INVENTION

The invention relates to a method and apparatus for sorting glass in general, and specifically, to a method and apparatus for sorting waste glass by color using a unique cullet color identification technique.

BACKGROUND OF THE INVENTION

Currently, there is a need to preserve natural resources and reduce dependence on landfills and similar waste storage facilities. To meet this need, several processes and machines are used to identify and sort waste materials, such as glass. Glass containers and other glass objects are recycled by first crushing or breaking the glass into glass cullet, which are small pieces of glass of varying characteristics that are distinguished by color. Prior to recycling, glass cullet of varying colors are placed on a conveyer belt and need to be separated and sorted.

The colored cullet are then identified and sorted based on the respective color of the cullet. For example, a typical collection of glass cullet may include pieces of clear, red, green and blue color components and combinations as well as contaminants. Prior art glass sorting machines function by passing the pieces of cullet (hereinafter referred to as "cullet") in a "waterfall" between colored LED light sources and light sensors arranged to define a sensing area. The cullet have different color characteristics which attenuate the light emitted from the light source in different amounts. For instance, a red colored cullet passed between a series of red and green light sources is identified as a red cullet based on attenuated light characteristics.

U.S. Pat. No. 5,314,071 to Christian et al. teaches a method of purification and color sorting of waste glass as well as a glass beneficiation process and apparatus. Christian et al. teach a method of sorting glass based on the transmission properties of the glass using red and green lamps. In addition, Christian et al. detail a method of using an actuator to deflect the trajectory of the glass. The deflection causes the glass to descend into one of two paths, which is the undeflected trajectory and the deflected trajectory. The specifics of the prior sorting system is taught and described in U.S. Pat. No. 5,314,071 to Christian et. al, which is hereby incorporated by reference.

As full scale beneficiation has become more prevalent, the disadvantages of the system and method taught in Christian et al. have been realized. First, the red and green lamps taught in Christian et al. limit the spectral response of the system. Glass entering the beneficiation plants contains shades of green, brown or blue that cannot be differentiated with a red and green lamp. The second disadvantage by the system taught in Christian et al., is that Christian et al. describe a means to deflect the trajectory of the descending glass with a single actuator, which is termed a binary sort. Therefore, the single actuator in Christian et al. performs several sorting stages to arrive at a pure material. Additional sorting stages add cost, energy and time to the equipment and sorting process.

In addition, the current actuators are air driven jets which shoot air at the cullet to deflect the cullet into their desired trajectories. However, small cullet having a dimension of less than 0.25 inches are unable to be properly sorted with air jets actuators due to the delay associated with air jet actuators. The valve within the air jet actuator is designed to require 3 to 5 milliseconds of pressure buildup before the actuator is able to discharge the adequate amount of forced air at the cullet. In addition, the compressibility characteristics of air prevents the actuator from quickly discharging and directing the compressed air to the falling cullet. Thus, the design and characteristics of air driven actuators cause the devices and the system in general to be relatively slow and inefficient.

SUMMARY OF THE INVENTION

One aspect of the invention is directed to a system which sorts a mixed stream of different colored glass cullet into separate groups of same colored cullet. The system comprises at least one light emitting source which transmits at least one light of predetermined frequency through a glass cullet. The light emitting source preferably includes a white light source. The system comprises at least one camera which has a plurality of pixels that receive light which is transmitted through the glass cullet. The camera provides at least one value from the light received, wherein the cullet is directed along a designated path based on the at least one value. The camera collects the received light at a desired sampling interval. The system comprises a circuit which converts the at least one value into a digital representation value and preferably calculates a non-linear function from the digital representation value. The system further comprises at least one actuator which directs the cullet along one or more deflected paths based on a value of the non-linear function. The at least one actuator preferably includes an air jet. In one embodiment, the actuator is an electrostatic actuator. In another embodiment, the actuator projects a substantially incompressible fluid toward the cullet. Preferably, the light emitting source is a white light source. The system according to claim 1 further comprising a conveyer belt for transporting cullet to a light sensing region, the conveyer belt coupled to a rotating mechanism for driving the conveyer belt at a desired speed. The system includes a feeding mechanism configured to deliver a constant flow of cullet to the conveyer belt.

Another aspect of the invention is directed to a method of effectively sorting a group of different colored objects into separate groups of similar colored objects. The method comprises transmitting at least one light, preferably white light, through at least one object in a light sensing region. The method also comprises determining at least one light intensity value from the transmitted light in the light sensing region. The method also comprises calculating a color value from the light intensity value. The method further comprises directing the at least one object to a path corresponding with the color value, wherein the path deposits the object into a corresponding container. The method further comprises providing the at least one object to the light sensing region. The method further comprises receiving the light transmitted through the at least one object at a desired sampling interval. The method further comprises converting the at least one value into a digital representation value. The method further comprises calculating a non-linear function from at least one digital representation value.

In another aspect of the invention, a multi-level sorting system which separates different colored cullet into cullet having substantially similar color characteristics. The system comprises means for transmitting at least one light through at least one cullet in a light sensing region. The system comprises means for determining at least one light intensity value from the transmitted light in the light sensing region. The system comprises means for calculating a color value from the at the least one light intensity value. The system comprises means for directing the at least one cullet to a desired path based on the color value.

In yet another aspect of the invention, a system which sorts a mixed stream of different colored objects, such as glass cullet, into separate groups of same colored objects. The system comprises a sorting device which further comprises at least one light emitting source which transmits at least one light of predetermined frequency, through at least one object and at least one camera which has a plurality of pixels to receive light that is transmitted through the at least one object. The light emitting source preferably includes a white light source. The camera provides at least one value from the light received from at least one of the plurality of pixels, wherein the at least one object is directed along at least one designated output path based on the at least one value. The system includes at least one subsequent sorting device which receives the at least one object from the at least one designated output path. The subsequent sorting device sorts the at least one object in the designated output path into a plurality of further sorted output feeds. In addition, at least one subsequent sorting device is a final sorting device, wherein the final sorting device sorts one or more subsequent input feeds into a plurality of final output feeds. At least one of the designated output paths contains objects of a desired color. In addition, at least one of the plurality of designated output paths contains undesired objects, wherein the undesired objects are directed to a rejection bin. Also, at least one of the plurality of designated output paths contains flint objects. The final sorting device directs each of the plurality of final output feeds into a plurality of corresponding storage bins. The camera collects the received light at a desired sampling interval. The system further comprises a circuit which converts the at least one value into a digital representation value and calculates a non-linear function from at least one digital representation value. The system further comprises at least one actuator, such as an electrostatic or fluid driving actuator, which directs the cullet along one or more deflected paths based on a value of the non-linear function. The at least one actuator preferably includes an air jet. The system further comprises a conveyer belt which transports cullet to a light sensing region, whereby the conveyer belt is coupled to a rotating mechanism which drives the conveyer belt at a desired speed. The system further comprises a feeding mechanism that is configured to deliver a constant flow of cullet to the conveyer belt.

DETAILED DESCRIPTION OF THE PRESENT INVENTION

Figure 1A:
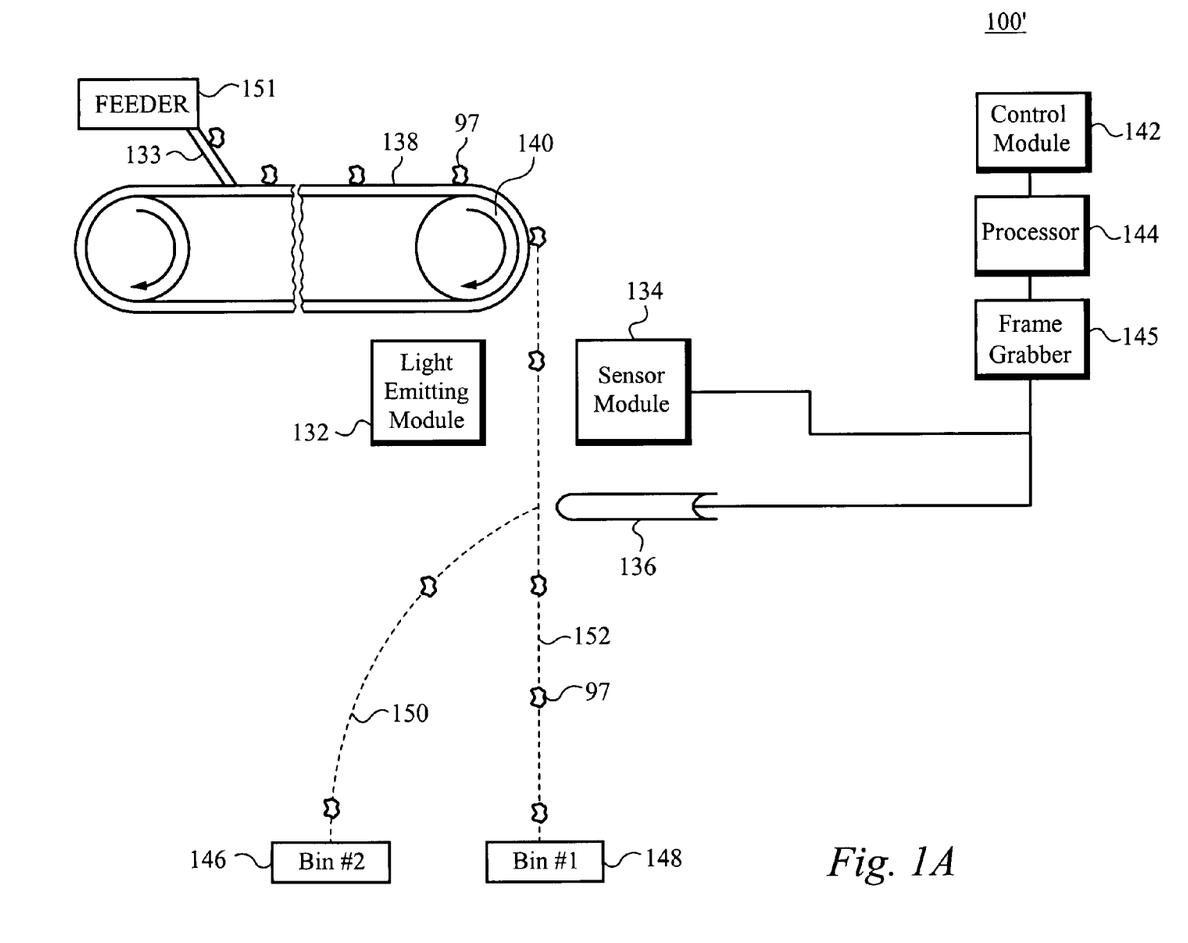
FIG. 1A illustrates a schematic of the preferred embodiment of the sorting mechanism in accordance with the present invention.

FIG. 1A illustrates a schematic of the preferred embodiment of the sorting apparatus 100' in accordance with the present invention. As shown in FIG. 1A, the sorting device 100' preferably includes a light emitting module 132 coupled to a sensor module 134, whereby the light emitting module 132 and the sensor module 134 are positioned opposite from one another along the initial or sensing path of the cullet 97. A control module 142 is coupled to the sensor module 134 and the actuator 136. In addition, a computer or other processing module 144 is coupled to the control module 142, the sensor module 134 and the actuator 136. In one embodiment, the control module 142 and the processing module 144 are integrated into one component.

Figure 1B:
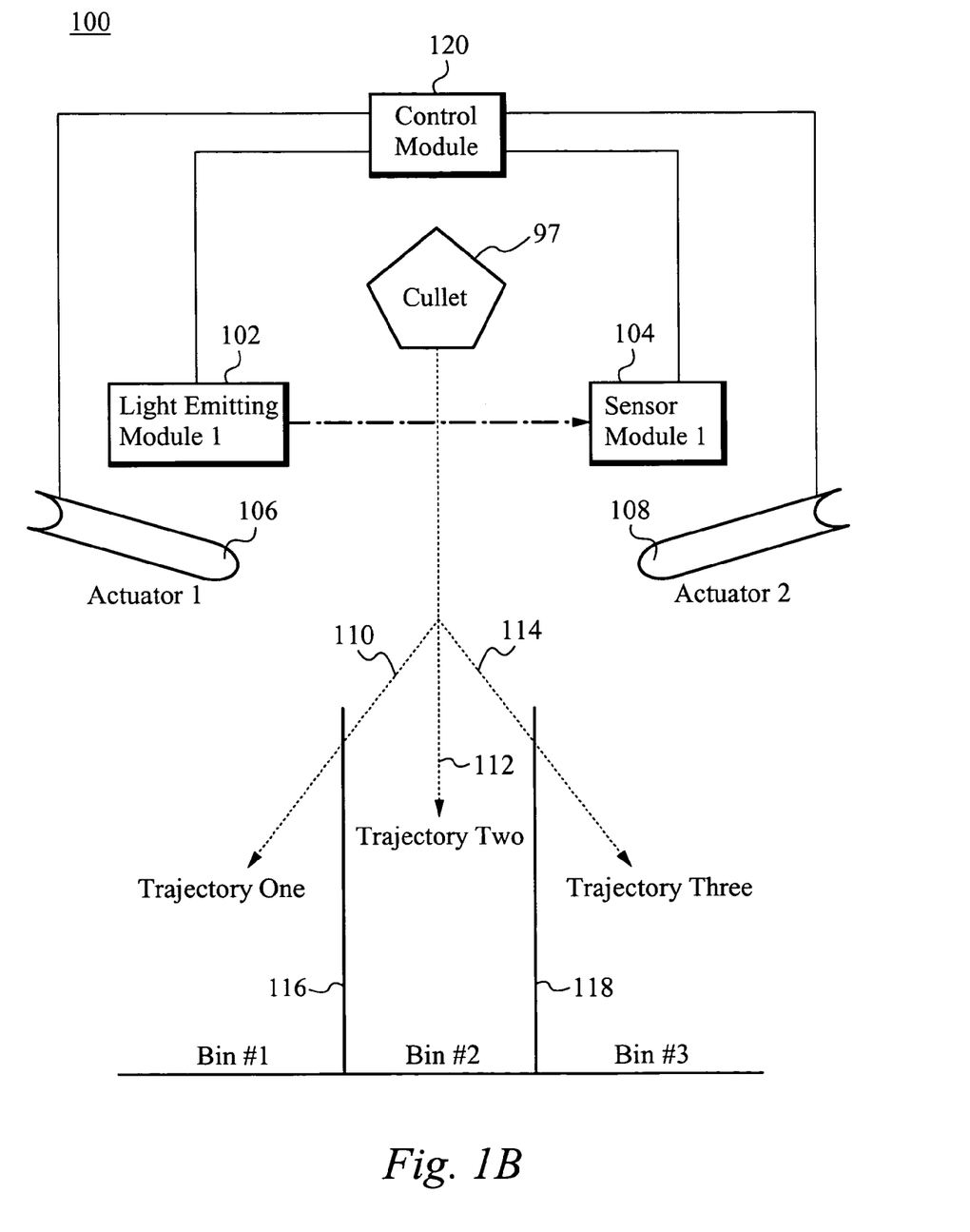
FIG. 1B illustrates a schematic of another embodiment of the sorting mechanism in accordance with the present invention.

The actuator 136 manipulates the path of the falling cullet 97 into a particular collection bin. The particular trajectory path that the cullet is directed along is determined by the transmission properties of the cullet 97 as well as the color sensed by the sensor module 134. As shown in FIG. 1A, the actuator 136 directs the cullet 97 in either of two trajectory paths 150, 152, whereby the trajectory path 152 directs the cullet 97 into a first collection bin 148, and the trajectory path 150 directs the cullet 97 into a second collection bin 146. The actuator 136 is positioned near the conveyer belt 138 and under the light sensing region as shown in FIG. 1A. The area which the cullet 97 falls through substantially in front of the actuator 136 is the actuating region or zone. Alternatively, as shown in FIG. 1B, the sorting device 100 includes a first actuator 106 and a second actuator 108 which are positioned opposite of one another on either side of the sensing path. The first actuator 106 and the second actuator 108 direct the cullet 97 along one of the three trajectory paths 110, 112 and 114 depending on the color of the cullet 97 as detected by the sensor module 104. The trajectory paths lead the cullet 97 into separate bins which are separated by mechanical separators 116, 118.

The sorting system of the present invention has a number of component subsystems that work in conjunction with one another to effectively sort and filter the array of mixed cullet into the desired bins, whereby each bin collects the substantially same colored cullet. It is apparent to one skilled in the art that the preprocessing and preparation stages are incorporated into the present system. The preprocessing and preparation stages preferably include a glass crushing operation, a glass washing operation, a sifting operation and a sorting preparation. A sifter (not shown) preferably removes the small undesirable shards of glass from the cullet that are to be sorted. The details of the sifter (not shown) are well known in the art and are not discussed in detail herein.

A vibratory feeder 151 feeds the cullet 97 onto a conveyor belt 138 via an exit chute 133, whereby the conveyor belt 138 delivers the cullet 97 to the area to be sorted. The vibratory feeder 151 delivers a constant flow of cullet to the sorting system 100', such that the total weight of cullet 97 on the conveyor belt 138 is constant at any given time. The entrance to the exit chute 133 is preferably narrow compared to the width of the conveyor belt 138 to allow the cullet 97 to be spread out laterally as well as longitudinally over the belt 138.

The conveyor belt 138 has an appropriate belt speed to accommodate efficient processing of the cullet 97. However, the speed of the conveyor belt 138 ensures that a cullet waterfall 97 passes through the light sensing region and actuating regions at a given time. Preferably, the conveyor belt 138 is moved at a speed of 40 inches per second. As the speed is increased, the available time to make a color decision is decreased. The cullet packing density on the conveyor belt, the belt speed and width are the primary factors determining the throughput of the system. For a range of particular sizes, processor capability, actuator speed, and sorter geometry, there is a satisfactory range of belt speeds. The optimum belt speed is calculated from this range. Within the system of the present invention, the conveyor belt 138 can be moved at speeds in the range of 1 to 70 inches per second.

In addition, the conveyor belt 138 preferably includes a roller 140 at the end proximal to the light sensing region, whereby the roller 140 has a diameter smaller than existing rollers. Preferably, the diameter of the roller 140 is the same size as the size of the smallest expected cullet. In this manner, all sizes of particles will achieve approximately the same trajectory and velocity, and the difference will be more insensitive to belt speed. Alternatively, a roller 140 of any other appropriate diameter is utilized within the conveyor belt 138. With large diameter rollers, the cullet 97 remains in contact with the belt and experiences movement in the clockwise direction of the roller as the cullet 97 approaches the light sensing region. In particular, as the cullet 97 approaches the light sensing region, the cullet 97 moves laterally and vertically due to being in contact with a larger roller. Therefore, the velocity vector of the cullet 97 includes a substantial horizontal vector component which manipulates the cullet 97 along an undesired trajectory. In contrast, the roller 140 within the diameter range specified above, prevents the cullet 97 from following the surface of the roller 140 as the cullet 97 begins to fall toward the light sensing region. Therefore, the preferred roller 140 causes the cullet 97 to easily separate from the conveyor belt 138 as the cullet 97 reaches the end of the belt 138 and falls toward the light sensing region. In addition, the smaller diameter roller 140 allows large and small cullet to follow the same waterfall trajectory, and the color of the glass can be detected closer to the conveyor belt 138. This closer distance allows precise control and less deviation of the velocity and position of the cullet 97 as the cullet 97 falls along the trajectory path.

Upon reaching the end of the conveyor belt 138, the cullet 97 falls along the waterfall path through the light sensing region, designated as the area between the light emitting module 132 and the sensor module 134. The light emitting module 132 is preferably a white light source which is constantly on when the system is running. The light emitting module 132 is preferably coupled to the system power source such that when the system power source is turned on, the light emitting module is turned on. Alternatively, the light emitting module 132 includes any number of light sources, such as light emitting diodes (LED), which emit any desired color or combination of colors. It is contemplated that the light emitting module is capable of emitting light continuously, sequentially and/or in regular intervals.

The preferred white light source within the light emitting module 132 uniformly emits all the frequency wavelengths in the light spectrum of interest. It is preferred that the white light source within the light emitting module 132 is a white LED source which emits light at a number of frequencies, and which is positioned beneath the roller 140, as shown in FIG. 1A. Alternatively, the light source 132 is placed elsewhere with respect to the conveyor belt 138 and positioned to substantially face the sensor module 134. In an alternative embodiment, the white light source within the light emitting module 132 is a tubular bulb gas discharge lamp. The light emitted by the light source within the light emitting module 132 is attenuated through the cullet 97, and the light transmitted through the cullet 97 is sensed by the sensor module or light sensor 134. In the case of an opaque contaminant, the absence of light blocked by the contaminant is sensed by the sensor module or light sensor 134.

The sensor module 134 preferably includes a line scan or line array camera which includes three rows of 2098 pixels each. In an alternate embodiment, the sensing module 134 is any other appropriate camera device. Each individual row of pixels in the camera 134 is preferably designated for sensing a particular color transmitted through the cullet 97. For instance, one row in the line array camera of the sensor module 134 is preferably sensitive to the intensity of red light, whereas the remaining two rows are correspondingly sensitive to the intensity of green and blue light. Alternatively, the line array camera of the sensor module 134 senses pixels of other colored light. The line array camera of the sensor module 134 preferably performs a sampling of the received light at regular intervals of 500 microseconds. Alternatively, the line array camera of the sensor module 134 performs the sampling of light at other desired timed intervals.

The line array camera of the sensor module 134 is preferably coupled to a frame grabber device 145. Alternatively, the frame grabber device 145 is incorporated within the line array camera of the sensor module 134 or the processing module 144. The frame grabber device 145 receives the output from the line array camera of the sensor module 134 in the form of analog signals which are representative of the intensity of colored light of each pixel sensed by the line array camera of the sensor module 134. The frame grabber device 145 converts the analog color intensity information into a digital representation for processing and analysis by the processing module 144. The frame grabber device 145 provides a digital value of the color intensity information which is preferably within the range of, and including, the digital values of 0 and 4095. In an alternative embodiment, the frame grabber device 145 is a digital frame grabber, whereby the digital frame grabber device 145 receives digital color intensity information directly from the line array camera within the sensor module 134 or an analog-to-digital (A/D) converter.

The processing module 144 is coupled to the frame grabber device 145 and receives the digital pixel information from the frame grabber device 145. Generally, the processing module 144 analyzes the digital pixel information and determines the color of the cullet 97 therefrom. In particular, the processing module 144 analyzes the digital pixel information to determine whether the light sensed by the sensing module 134 is white light directly from the white light source within the light emitting module 132 or colored light transmitted through the cullet 97. In addition, the processing module 144 analyzes the digital pixel information to determine whether any light at all was sensed by the sensing module 134. In the case where little or no light was sensed by the line array camera within the sensor module 134, the processing module 144 will conclude that the particular cullet 97 is opaque or has an impurity within.

The digital pixel information is analyzed by the processing module 144 to determine if the color sensed is one of the colors of interest in the sorting process. The processing module 144 utilizes an algorithm to determine the color of the analyzed glass cullet, whereby the algorithm takes into account several different factors. The preferred algorithm is shown as:

$$f(r, g, b) = k_0 + \frac{k_1 r + k_2 g + k_3 b}{r + g + b}$$

As shown in the equation above, the value r, is the digital value of the pixels in the sensing module 134 which are sensitive to the received red light. The value g, is the digital value of the pixels in the sensing module 134 which are sensitive to the received green light. In addition, the value b, is the digital value of the pixels in the sensing module 134 which are sensitive to received blue light. As stated above, the digital values of r, g, and b are preferably in the range between and include the values of 0 and 4095 and are preferably obtained from the frame grabber device 145. The denominator of this algorithm normalizes color discrimination to be independent of the total intensity (r+g+b) observed.

The preferred algorithm for detecting opaque objects is shown as:

$$f(r,g,b) = k_0 + k_1 r + k_2 g + k_3 b$$

If it is determined using this opaque algorithm that the function is less than zero, then the pixel is dark and the ejection valve should be turned on to eject the cullet from the stream. The threshold variable $k_0$ is preferably set high enough so that all the contaminants are ejected from the stream and land in the contaminant box and all the colored pieces remain within the stream of cullet to be further sorted.

The values of the variables $k_0$, $k_1$, $k_2$, and $k_3$ are determined empirically to provide the best performance of the sorting system based on the color being detected by the sensor 104'. Using the color algorithm above, when ejecting a specific color, such as for example red, from the stream of cullet, the value of r will be big and the value of b and g will be small, because a red cullet will pass red light and attenuate blue and green light. For the maximum value of the fraction with a red cullet, the value of r is set to 4000, the value of b and g is set to zero, $k_1$ is set to 1, and $k_2$ and $k_3$ are both set to zero. With these values, the fraction f is then equal to 1. If there is then a red cullet, with values of r=3000, g=300 and b=300 and the variables are set to $k_1$=1, $k_2$=0.1, and $k_3$=0.1, the fraction f is equal to 0.85. If the variables $k_1$, $k_2$, and $k_3$ are the same and a green cullet is detected with values of r=300, g=3000 and b=300, the fraction f is then equal to 0.175. When there is nothing in the optical path, the values are equal to r=4000, g=4000 and b=4000. In this situation, with the same values for the variables, the fraction f is equal to 0.4. Using this analysis, a value of the fraction f over 0.5 would verify the detection of a red cullet. The processing module is preferably set to activate the actuator 136 to eject a particular cullet when the value of the fraction f is greater than zero. Accordingly, in this situation, the value of $k_0$ is set to −0.5, so that anything over a zero will be ejected as a red cullet.

A similar analysis is applied to the detection of any other color or combination of colors. Presenting sample glass of different colors to the camera, and recording the camera measurements for known colors of glass, determine the value of the variables $k_0$, $k_1$, $k_2$, and $k_3$. The values of the variables $k_0$, $k_1$, $k_2$, and $k_3$ are then adjusted incrementally to optimize the discrimination of the system between colors. The values of the variables $k_0$, $k_1$, $k_2$, and $k_3$ are preferably different for each separation step.

Preferably, the processing module 144 maintains a circular array of storing flags which indicate whether the actuator 136 should be activated to eject a particular cullet within the light sensing region. The array is preferably as wide as the number of actuators 136. In addition, the array is preferably as long as the number of line scans which the line array camera within the sensor module 134 performs in the time that the cullet 97 falls from location of the sensing module 134 to the location of the actuator 136. After each camera line scan, the results of the color data analysis are stored in the line of an eject flag array at the location of the input pointer to the array. The input pointer is then moved to the next location along the entire scan line. After each camera line scan, the output pointer to the array is moved to the next line. If any eject flags are present in the corresponding scanned array line, a signal is sent to the actuator 136, and the corresponding actuator 136 is activated.

Once the color of the passing cullet 97 is identified, the control module 142 activates the actuator 136 to deflect the cullet 97 into a desired trajectory path 150. Alternatively, the control module 142 does not activate the actuator 136, whereby the cullet 97 merely continues along the initial trajectory path 152. In the preferred embodiment, when the processing module 144 determines that the function f, of the above equation is greater than 0, the processing module 144 concludes that the color sensed by the sensing module 134 is transmitted through a cullet 97 which is desired to be removed from the initial trajectory path and is therefore deflected. In contrast, when the processing module 144 determines that the function f, is less than or equal to 0, the control module 142 will not instruct the actuator 136 to activate and will allow the cullet 97 to travel along the initial trajectory path, undeflected.

The actuator 136 of the present invention is preferably a fluid driving device. A fluid driving actuator 136 operates at a substantially faster rate than typical air jets and does not suffer from material compressibility issues which exist with air actuators. A fluid driving actuator 136 preferably projects a substantially incompressible fluid toward the cullet 97 as the cullet falls along the path through the actuating zone. Preferably, the actuator 136 directs recycled water at the cullet 97, although other fluids are alternatively contemplated. Piezoelectric valves are preferably utilized within the fluid driving actuator 136 to control the speed and volume of the liquid directed at the cullet 97 at a particular time. In one embodiment, the piezoelectric valves within the actuator 136 allow an amount of fluid equal to a few picoliters to be discharged from the actuator 136. The preferred actuator 136 therefore is configured to propel small cullet particles in a selective and accurate manner.

Figure 1C:
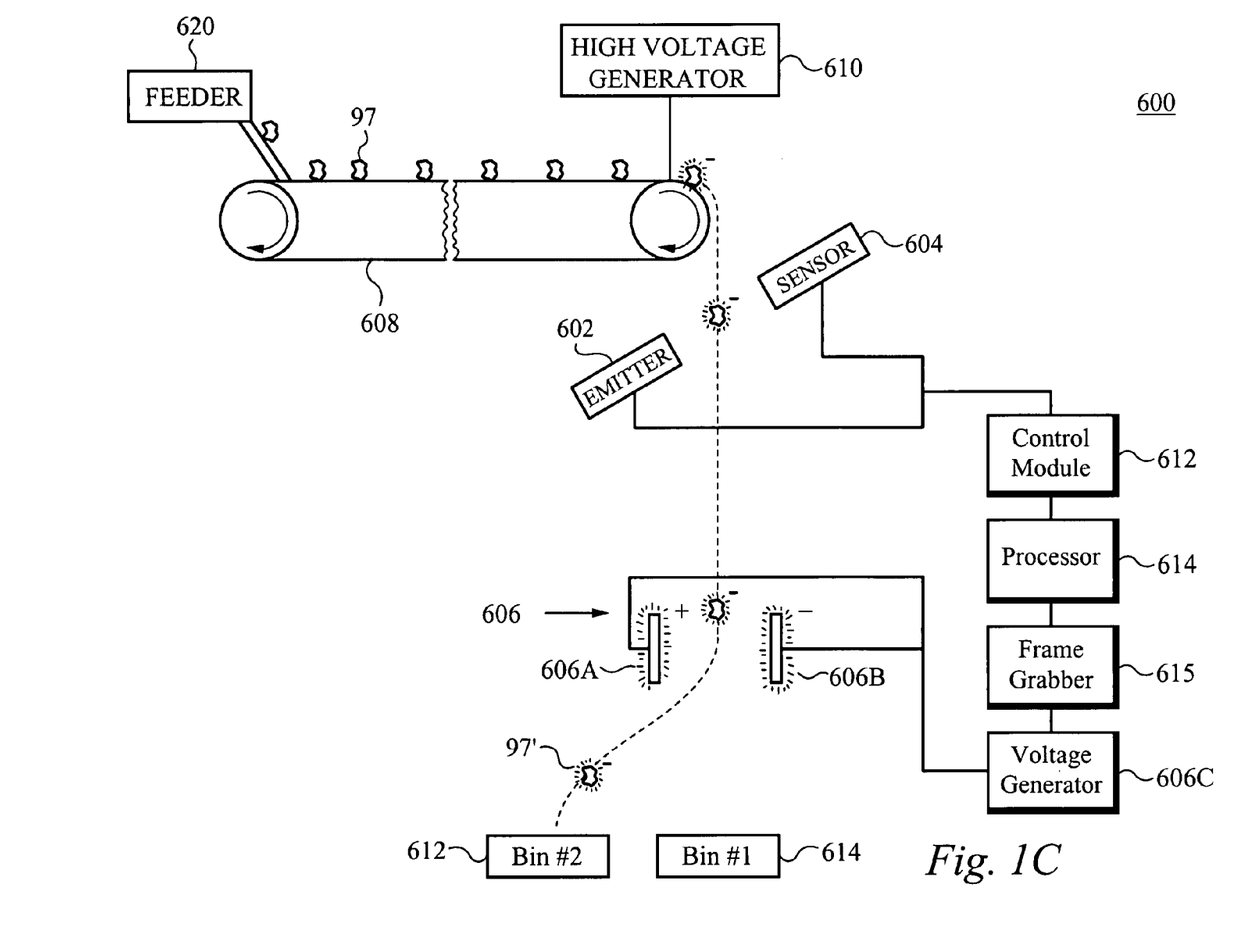
FIG. 1C illustrates a schematic of an actuating device for use in the sorting mechanism in accordance with the present invention.

As shown in FIG. 1C, the actuator 606 of the present invention is alternatively an electrostatic device, whereby the electrostatic actuator 606 operates at a substantially faster rate than typical air jets. Similar to a fluid driving actuator, the electrostatic actuator does not suffer from compressibility issues in air driven actuators. The electrostatic actuating device 606 utilizes electrostatically charged cullet 97 having a desired polarity, whereby the actuating device 606 either generates a same or opposite polarity to influence the cullet 97 to fall along a desired trajectory. The system 600 charges the cullet 97 by applying a high voltage to the cullet 97. In one embodiment, a high voltage generator component 610 electrically charges the cullet 97 along the conveyer belt 608. In another embodiment, the cullet 97 are charged along the conveyer belt 608. The details of how cullet are polarized or charged are well known in the art and are not discussed herein.

As shown in FIG. 1C, the electrostatic actuating device 606 preferably includes pairs of metal plates 606A, 606B separated by a distance and aligned parallel to one another. Preferably, the metal plates are printed on a printed circuit board and of a size approximately the size of the expected cullet to be separated. Alternatively, the two plates 606A, 606B are aligned non-parallel to one another. A power source 606C is coupled to the two plates 606A, 606B and provides a voltage to charge the plates to a desired electrical potential. The charged cullet 97' passes through the light sensing region between the light source 602 and the sensing module 604 and then falls along the path through the actuation region between the plates 606A, 606B. The plates 606A, 606B are individually or collectively charged to attract or repel the charged cullet 97 to deflect the cullet 97. Based on the instructions provided by the processing module 614, the plates 606A, 606B are energized to a desired polarity to direct the charged cullet 97 to the appropriate bin. For example, as shown in FIG. 1C, a negatively charged cullet 97' will be attracted toward the left plate 606A, which is positively charged, and repelled by the right plate 606B, which is negatively charged. The charged cullet 97' will therefore be deflected by the charged plates 606A, 606B toward the bin 612. In the event that the processor 615 determines that the charged cullet 97 is to be directed to the bin 614, a reverse voltage is applied to the plates 606A, 606B. The plate 606A will thereby be positively charged and the plate 606B will be negatively charged. Therefore, the repelling force of the negatively charged plate 606A will aid in directing the cullet 97 to the bin 614.

The amount of deflection that the charged cullet 97 undergoes is proportionate with the how highly the cullet 97 is charged and the strength of the electrical field across the plates 606A, 606B of the actuator 606. The strength of the electrical field between the plates 606A, 606B is in proportion with the amount of voltage between the plates 606A, 606B as well as the distance between the plates 606A, 606B. Alternatively, only one of the plates is charged to a desired polarity and the remaining plate is not charged. Alternatively, in a further alternate embodiment, it is also contemplated that neither plate 606A, 606B is charged, whereby the charged cullet 97 falls along the initial trajectory path to a corresponding bin (not shown).

Figure 2:
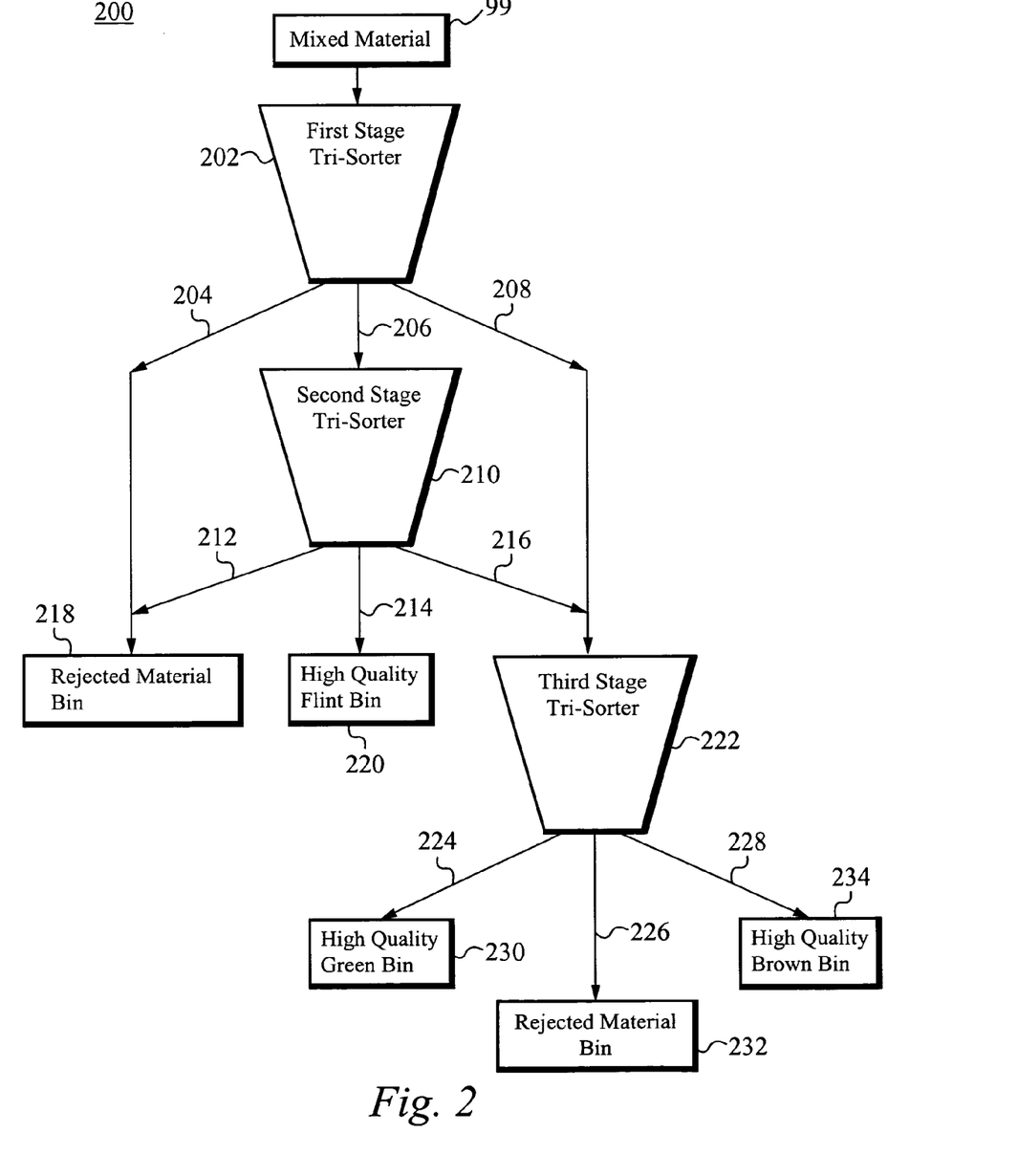
FIG. 2 illustrates a three stage glass sorting system with tri-sorter mechanism in accordance with the present invention.

FIG. 2 illustrates a three stage glass sorting system 200 with multiple tri-sorter mechanisms in accordance with the present invention. It should be noted that the description regarding the color identification techniques and actuators described above in relation to FIGS. 1A-1C is applicable to the sorting apparatus in FIGS. 2 and 3. As shown in FIG. 2, the sorting system 200 includes a first stage tri-sorter 202 coupled to a second stage tri-sorter 210. The first stage tri-sorter 202 and the second stage tri-sorter 210 are coupled to a rejected material bin 218 and a third stage tri-sorter 222. In addition, the second stage tri-sorter 210 is coupled to a high quality flint bin 220. The third stage tri-sorter 222 is coupled to a high quality green cullet bin 230, a poor quality flint bin 232 and a high quality brown cullet bin 234.

Figure 4:
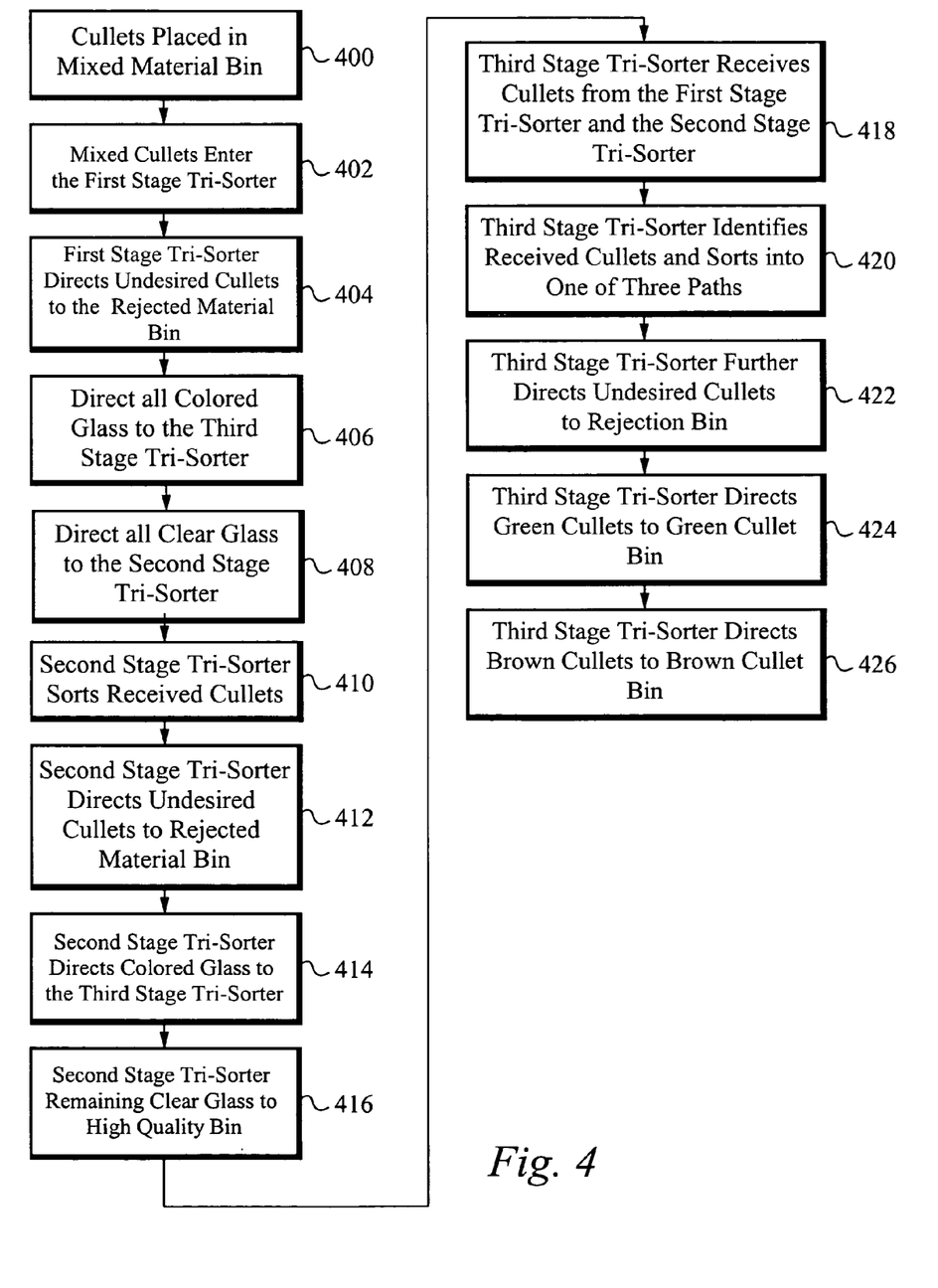
FIG. 4 illustrates a flow chart of the sorting method in the three stage glass sorting system of the present invention.

The operation of the three stage sorting system 200 of the present invention will now be discussed in conjunction with the flow chart illustrated in FIG. 4. In particular, crushed glass is placed in the mixed material bin 99 at the step 400. It should be noted that the objects in the mixed material bin 99 preferably undergo preprocessing procedures discussed above before being placed in the mixed material bin 99. The cullet are transported via a transporting mechanism, such as a conveyer belt, from the mixed material bin 99 and fed into the first stage tri-sorter 202 at the step 402. The transport mechanism used to deliver the cullet to the mixed material bin 99 can be any appropriate conventional type used or known in the art and is not discussed in detail herein. The tri-sorters discussed in each of the embodiments hereinafter preferably include the exit roller (FIG. 1A) discussed above to minimize sensing path problems.

The first stage tri-sorter 202 operates in the manner discussed above and deflects the cullet into one of three deflection or trajectory paths, 204, 206, 208. Using the preferred identification process discussed above, the first stage tri-sorter 202 deflects all the cullet identified as having undesirable characteristics into the deflection path 204. The undesired materials are thus deflected and fall into the rejected material bin 218 at the step 404. Such undesirable characteristics or materials include, but are not limited to, opaque materials, ceramics, and glass with labels. It is apparent to one skilled in the art that any other materials can be identified as undesirable.

The first stage tri-sorter 202 also deflects all cullet identified as having green characteristics as well as cullet identified as having brown characteristics into deflection path 208 from the mixed input at the step 406. Therefore, all the green and brown glass is deflected and directed via a conventional transport mechanism to the third stage tri-sorter 222 for further processing, as discussed below. The first stage tri-sorter 202 also directs all cullet identified as having clear characteristics to path 206, whereby the clear or flint glass is directed to the second stage tri-sorter 210, at the step 408, via a conventional transport mechanism. Preferably, the clear or flint glass is allowed to fall undeflected, whereby no actuation is applied to the flint glass by the first stage tri-sorter 202. Alternatively, instead of allowing the cullet to fall undeflected, the identified clear glass is actuated and is deflected in a desired angled trajectory such as paths 204 or 208.

The second stage tri-sorter 210 receives the cullet fed into the path 206 from the first stage tri-sorter 202 at the step 410. In the present example, the majority of cullet fed into the second stage tri-sorter 210 have clear characteristics due to the operation performed by the first stage tri-sorter 202. Upon receiving the cullet from path 206, the second stage tri-sorter 210 identifies the received sorted cullet and further sorts and directs the identified cullet into one of the three trajectory paths, 212, 214, 216. Using the preferred identification process discussed above, the second stage tri-sorter 210 deflects all cullet identified as having undesirable characteristics into the deflection path 212. The undesired materials are deflected and fall into the rejected material bin 218 at the step 412. Such undesirable characteristics or materials are mentioned above and any materials can be programmed to be identified as undesirable.

The second stage tri-sorter 210 also deflects all cullet identified as having green characteristics as well as cullet identified as having brown characteristics into the deflection path 216 at the step 414. Therefore, all green and brown glass cullet are deflected from the second stage tri-sorter 210 and directed to the third stage tri-sorter 222 via a conventional transport mechanism for further processing, as discussed below. The second stage tri-sorter 210 also directs all cullet identified as having clear characteristics to path 214, whereby the clear flint glass is directed to the high quality flint bin 220 at the step 416. Preferably, the flint cullet are allowed to fall undeflected, whereby no actuation is applied to the flint cullet by the second stage tri-sorter 210. Alternatively, the identified clear flint cullet are actuated and are deflected in a desired trajectory, such as the paths 212 or 216. Therefore, the second stage tri-sorter 210 further sorts the cullet identified and sorted by the first stage tri-sorter 202. In this example, the second stage tri-sorter 210 sorts the remaining clear flint cullet out from the mixed material cullet into bin 220. It should be noted that although the clear flint cullet are separated out completely by the second stage tri-sorter 210, it is apparent that any other desired glass can be completely sorted by the second stage tri-sorter, instead of clear flint cullet.

The third or final stage tri-sorter 222 shown in FIG. 2 receives the cullet directed along the path 208 from the first stage tri-sorter 202 at the step 418. In addition, the third stage tri-sorter 222 receives the cullet directed along the path 216 from the second stage tri-sorter 210 at the step 418. Preferably, the cullet received by the third stage tri-sorter 222 along the paths 208 and 216 are mixed green and brown cullet. In the present example, the majority of cullet fed into the third stage tri-sorter 222 have green and/or brown characteristics due to the operation performed by the first and second stage tri-sorters 202, 210. However, the third stage tri-sorter may receive any other output feed of cullet from the first and/or second stage tri-sorter 202, 210. Upon receiving the mixed cullet from the paths 208 and 216, the third stage tri-sorter 222 identifies the received cullet and sorts the identified cullet into one of the three trajectory paths, 224, 226 and 228 at the step 420. Using the identification process discussed above, the third stage tri-sorter 222 deflects all cullet identified as having undesirable characteristics into the path 226, whereby the undesired cullet are directed to the rejection bin 232 at the step 422. Such undesirable characteristics or materials are mentioned above and any of the received materials can be programmed into the third stage tri-sorter to be identified and sorted as undesirable.

The third stage tri-sorter 222 also identifies and sorts all cullet identified as having green characteristics into the deflection path 224, whereby the deflected green cullet are sent to the high quality green cullet bin 230 at the step 424. The third stage tri-sorter identifies and deflects all cullet identified as having brown characteristics into the deflection path 228, whereby the deflected brown cullet are sent to the high quality brown cullet bin 234 at the step 426. Therefore, the third stage tri-sorter 222 further sorts the cullet already identified and sorted by the first and second stage tri-sorters 202, 210, whereby the third stage tri-sorter 222 completely filters the green and brown cullet out from the mixed material. The multi-stage system 200 of the present invention thereby provides a more thorough sorting operation than previous sorting systems. Accordingly, the system 200 of the present invention utilizes subsequent sorting devices to further sort the output from preceding sorting devices, whereby the subsequent sorting devices direct the cullet into bins to have a homogenous collection of colored cullet. This allows each tri-sorter within the multi-stage system 200 to be optimized to sort glass with particular characteristics. For example, within the multi-stage system 200 of FIG. 2, the second stage tri-sorter 210 is optimized to sort clear flint glass and the third stage tri-sorter 222 is optimized to sort green and brown glass.

Figure 3:
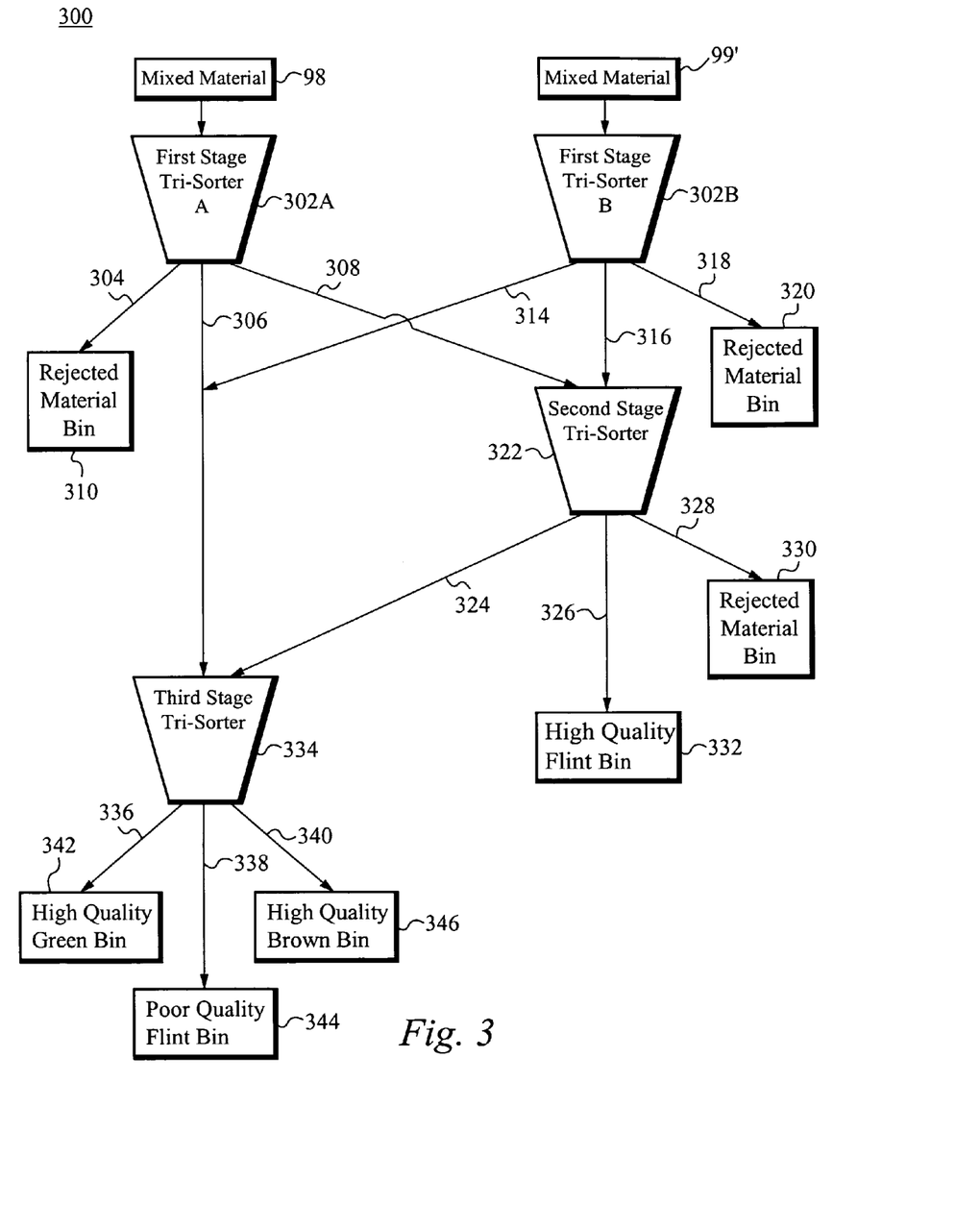
FIG. 3 illustrates a four stage glass sorting system with tri-sorter mechanism in accordance with the present invention.

FIG. 3 illustrates a four stage glass sorting system 300 with multiple tri-sorter mechanisms in accordance with the present invention. As shown in FIG. 3, the sorting system 300 includes a first stage tri-sorter A 302A and a first stage tri-sorter B 302B which preferably operate simultaneously with the other tri-sorters in the system 300. The first stage tri-sorter A 302A is coupled to a rejection bin 310, a second stage tri-sorter 322 and a third stage tri-sorter 334. The first stage tri-sorter B 302B is coupled to the third stage tri-sorter 334, the second stage tri-sorter 322 as well as a rejection bin 320. The second stage tri-sorter 322 is coupled to the third stage tri-sorter 334, a high quality flint bin 332 and a rejection bin 330. The third stage tri-sorter 334 is coupled to a high quality green cullet bin 342, a rejection or poor quality flint bin 344 and a high quality brown cullet bin 346.

Figure 5:
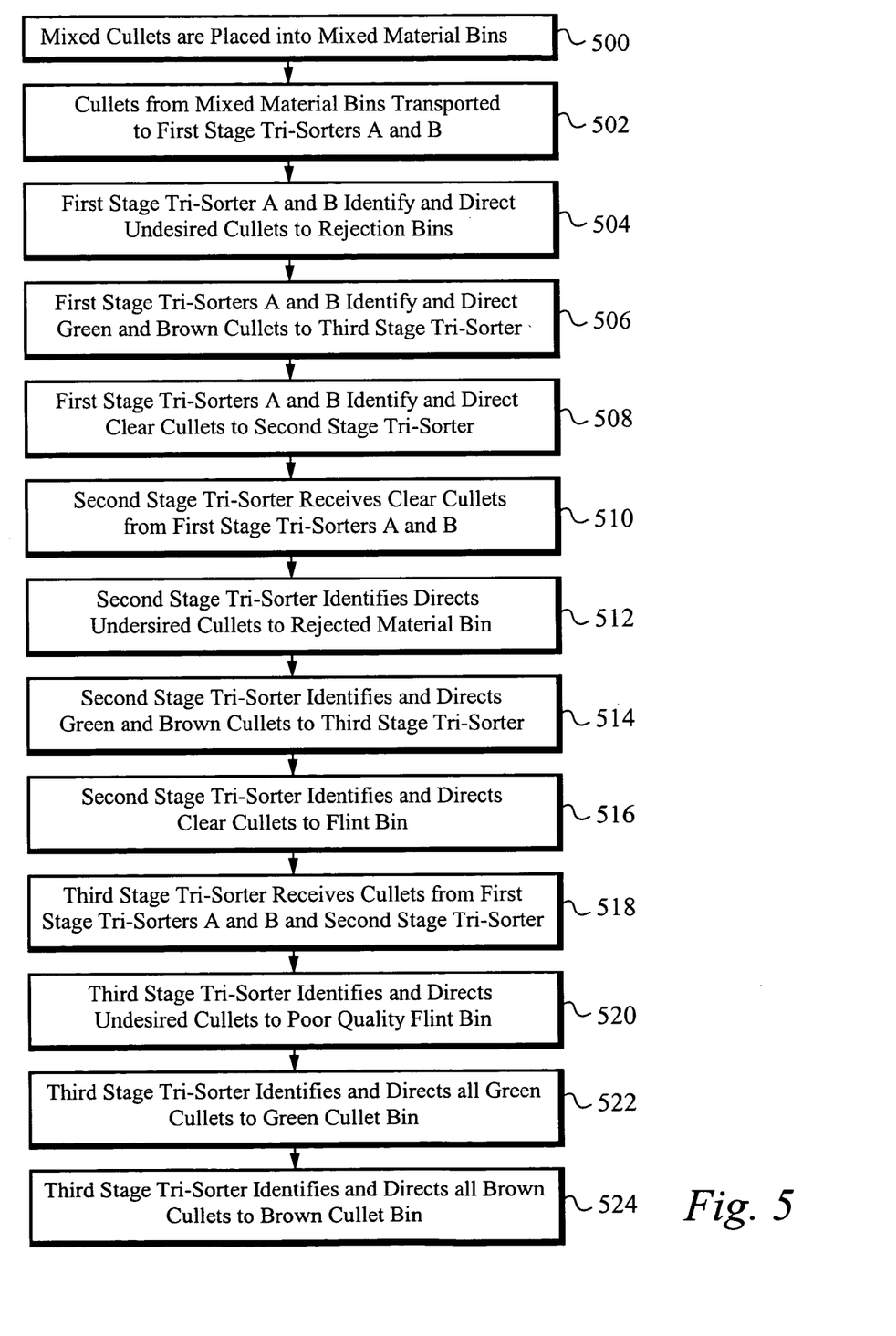
FIG. 5 illustrates a flow chart of the sorting method in the four stage glass sorting system of the present invention.

The operation of the four stage sorting system 300 of the present invention will now be discussed in conjunction with the flow chart illustrated in FIG. 5. In particular, crushed cullet or pieces, such as opaque, ceramics, glass with labels as well as colored glass, are placed in two mixed material bins 98 and 99' at the step 500. It should be noted that the cullet in the mixed material bins 98, 99' preferably undergo preprocessing procedures discussed above before being placed in the mixed material bins 98, 99'. The cullet from the mixed material bin 98 are transported via a transporting mechanism to the first stage tri-sorter A 302A at the step 502. In addition, cullet from the mixed material bin 99' are transported via a transporting mechanism to the first stage tri-sorter B 302B at the step 502. As stated above, the transport mechanism can be any appropriate conventional type used or known in the art and is not discussed in detail herein.

The first stage tri-sorter A 302A deflects the cullet into one of three deflection or trajectory paths, 304, 306, 308. Using the identification process discussed above, the first stage tri-sorter A 302A deflects all cullet identified as having undesirable characteristics to the deflection path 304 and into the rejected material bin 310 (step 504). The first stage tri-sorter A 302A directs all cullet identified as having green characteristics as well as cullet identified as having brown characteristics into the path 306, whereby the cullet in path 306 are directed to the third stage tri-sorter 334 at the step 506. Thus, all green and brown glass is directed to the third stage tri-sorter 334 via a conventional mechanism for further processing, as discussed below. Preferably, the green and brown cullet are allowed to fall along the path 306 undeflected, whereby no actuation is applied to the cullet by the first stage tri-sorter A 302A. Alternatively, instead of allowing the cullet to fall undeflected, the identified cullet are actuated by the first stage tri-sorter A 302A and are deflected in a desired trajectory such as paths 304 or 308. The first stage tri-sorter A 302A also directs all cullet identified as having clear characteristics to path 308, whereby the clear or flint glass is directed to the second stage tri-sorter 322, at the step 508 via a conventional transport mechanism.

Preferably, the first stage tri-sorter B 302B simultaneously operates along with first stage tri-sorter A 302A. The cullet to be sorted are transported via a transporting mechanism from the mixed material bin 99' to the first stage tri-sorter B 302B at the step 502. As stated above, the transport mechanism can be any appropriate conventional type used or known in the art and is not discussed in detail herein. The first stage tri-sorter B 302B deflects the cullet into one of three deflection or trajectory paths, 314, 316, 318. Using the identification process discussed above, the first stage tri-sorter B 302B deflects all cullet identified as having undesirable characteristics to the deflection path 318 and into the rejected material bin 320 at the step 504. The first stage tri-sorter B 302B directs all cullet identified as having green characteristics as well as cullet identified as having brown characteristics into the path 314 at the step 506. Thus, all sorted green and brown glass is directed from the first stage tri-sorter B 302B to the third stage tri-sorter 334 via a conventional mechanism for further processing, as discussed below. The first stage tri-sorter B 302B also directs all cullet identified as having clear characteristics to the path 316, whereby the clear or flint glass is directed to the second stage tri-sorter 322 (step 508) via a conventional transport mechanism. Preferably, the flint cullet are allowed to fall undeflected along the trajectory path 316, whereby no actuation is applied to the cullet by the first stage tri-sorter B 302B. Alternatively, instead of allowing the flint cullet to fall undeflected, the identified flint cullet are actuated by the first stage tri-sorter B 302B to a desired trajectory such as paths 314 or 318.

The second stage tri-sorter 322 receives the cullet directed along the path 308 from the first stage tri-sorter A 302A and along the path 316 from the first stage tri-sorter B 302B at the step 510. Upon receiving the cullet from the paths 308 and 316, the second stage tri-sorter 322 identifies the received cullet and further sorts and directs the identified cullet into one of three paths, 324, 326 and 328. Using the identification process discussed above, the second stage tri-sorter 322 deflects all cullet identified as having undesirable characteristics along the deflection path 328. The details of the undesirable cullet are mentioned above. The undesired materials that are deflected into the path 328 fall into the rejected material bin 330 at the step 512.

The second stage tri-sorter 322 also deflects all cullet identified as having green characteristics as well as cullet identified as having brown characteristics into the deflection path 324 at the step 514. Therefore, all green and brown glass is deflected from the second stage tri-sorter 322 to the third stage tri-sorter 334 via a conventional transport mechanism for further processing, as discussed below. In the present example, the majority of cullet fed into the second stage tri-sorter 322 have clear characteristics from the sorting operation performed by the first stage tri-sorters A and B 302A, 302B. The second stage tri-sorter 322 also directs all cullet identified as having clear characteristics to path 326, whereby the flint glass is directed to the high quality flint bin 332 at the step 516. Preferably, the flint cullet are allowed to fall undeflected along the trajectory path 326, whereby no actuation is applied to the flint cullet by the second stage tri-sorter 322. Alternatively, the identified clear glass is actuated and is deflected in a desired trajectory path such as paths 324 or 328. Thus, the second stage tri-sorter 322 further sorts the cullet already identified and sorted by the first stage tri-sorters A and B 302A, 302B, thereby completely separating the flint cullet from the mixed collection.

The third or final stage tri-sorter 334 shown in FIG. 3 receives the cullet directed along the paths 306, 314 and 324 from the first stage tri-sorters A and B 302A, 302B and second stage tri-sorter 322, respectively at the step 518. Preferably, the cullet received in the third stage tri-sorter 334 along the paths 306, 314 and 324 are mixed green and brown cullet. In the present example, the majority of cullet fed into the third stage tri-sorter 334 have green and/or brown characteristics due to the operation performed by the first stage tri-sorters A and B 302A, 302B as well as the second stage tri-sorter 322. Upon receiving the green and brown cullet directed along the paths 306, 314 and 324, the third stage tri-sorter 334 further identifies and sorts the identified cullet into one of the three paths, 336, 338 and 340. Using the identification process discussed above, the third stage tri-sorter 334 allows all cullet identified as having undesirable characteristics to fall along the path 338 at the step 520, whereby the undesired cullet are directed to the rejected bin 344. Alternatively, instead of allowing the undesired cullet to fall undeflected, the undesired cullet are actuated to a desired trajectory such as paths 336 or 340.

The third stage tri-sorter 334 also identifies and sorts all cullet identified as having green characteristics into the deflection path 336, whereby the deflected green cullet are sent to the high quality green cullet bin 342 at the step 522. In addition, the third stage tri-sorter 334 identifies and deflects all cullet identified as having brown characteristics into the deflection path 340, whereby the deflected brown cullet are sent to the high quality brown cullet bin 346 at the step 524. Therefore, the third stage tri-sorter 334 further sorts the cullet already identified and sorted by the first and second stage tri-sorters 302A, 302B and 322, thereby completely separating all the green and brown cullet into their respective bins. Accordingly, the system 300 of the present invention utilizes subsequent sorting devices to further sort the output from preceding sorting devices, whereby the subsequent sorting devices direct the cullet into bins to have a homogenous collection of colored cullet. This allows for optimization of the sorting characteristics of each tri-sorter stage within the multi-stage system 300.

The scalability of the present sorting system allows for any volume of cullet. Although the multi-sorting system described above is preferably utilized for glass cullet, it is apparent to one skilled in the art that the system is alternatively used to sort other objects. It is understood by one skilled in the art that any number of tri-sorters are utilized in the system to sort the cullet into any number of bins. In addition, the tri-sorters in the system 200, 300 may be positioned in any other configuration with respect to one another and is not limited to the configurations shown in FIGS. 2 and 3. In addition, the tri-sorters can be configured such that the cullet are deflected along a path different than those shown in FIGS. 2 and 3. Further, it is understood that the tri-sorters may be positioned such that the undesired cullet are directed into one bin instead of multiple bins. For instance, the tri-sorters can be reconfigured or repositioned such that all the undesired cullet fall into one rejection bin, such as bin 344, instead of three rejection bins 310, 320, and 344. In addition, although the steps are shown in a particular order in regards to the flowcharts in FIGS. 4 and 5, it should be noted that each tri-sorter is identifying and sorting the cullet simultaneously.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A system for sorting a mixed stream of different colored glass cullet into separate groups of same colored glass cullet comprising:
   a. a plurality of first stage sorting devices each for receiving an input feed of different colored objects and sorting the different colored objects into a plurality of first stage output feeds, wherein the plurality of first stage sorting devices operate simultaneously, and further wherein at least one of the plurality of sorting devices sorts the different colored objects into more than two output feeds;
   b. a second stage sorting device configured to receive at least one of the first stage output feeds, thereby forming a second stage output feed; and
   c. a third stage sorting device configured to directly receive at least one of the first stage output feeds which bypass the second stage sorting device, and the second stage output feed, thereby forming a third stage output feed;
   each of the stages comprising:
      i. at least one light emitting source for transmitting at least one light of predetermined frequency through a glass cullet;
      ii. at least one camera having a plurality of pixels for receiving light transmitted through the glass cullet, the camera providing at least one value from the light received from at least one of the plurality of pixels, wherein the cullet moves along a designated path based on the at least one value; and
      iii. a processing module coupled to receive the at least one value from the camera, wherein the processing module determines a color of the glass cullet based on the at least one value which is used to determine the designated path on which the cullet is moved.

2. The system according to claim 1 wherein the at least one camera collects the received light at a desired sampling interval.

3. The system according to claim 2 further comprising a circuit for converting the at least one value into a digital representation value.

4. The system according to claim 3 wherein the circuit calculates a non-linear function from at least one digital representation value.

5. The system according to claim 4 further comprising at least one actuator for directing the cullet along one or more deflected paths based on a value of the non-linear function.

6. The system according to claim 5 wherein the at least one actuator includes an air jet.

7. The system according to claim 5 wherein the at least one actuator is an electrostatic actuator.

8. The system according to claim 5 wherein the at least one actuator projects a substantially incompressible fluid toward the cullet to deflect the cullet.

9. The system according to claim 1 wherein the light emitting source includes a white light source.

10. The system according to claim 1 further comprising a conveyer belt for transporting cullet to a light sensing region, the conveyer belt coupled to a rotating mechanism for driving the conveyer belt at a desired speed.

11. The system according to claim 10 further comprising a feeding mechanism configured to deliver a constant flow of cullet to the conveyer belt.

12. The system according to claim 1 wherein the light emitting source includes one or more of a red light emitting diode, a green light emitting diode, a blue light emitting diode and an infrared light source.

13. The system according to claim 1 wherein the third stage sorting device sorts the at least one of the first stage output feeds and the second stage output feed into a plurality of third stage output feeds, at least one of the third stage output feeds contain objects of a desired color.

14. The system according to claim 13 wherein at least one of the third stage output feeds contains undesired objects, wherein the undesired objects are directed to a rejection bin.

15. The system according to claim 13 wherein at least one of the third stage output feeds contains flint objects.

16. The system according to claim 13 wherein the third stage sorting device directs each of the plurality of third stage output feeds into a plurality of corresponding storage bins.

17. The system according to claim 1 wherein the processing module further comprises a frame grabber device that receives the at least one value from the camera, wherein the at least one value is an analog value representative of color intensity information and further wherein the frame grabber device converts the color intensity information into a digital representation that is utilized by the processing module to determine the color.

18. The system according to claim 1 wherein the light emitting source includes one or more of a red light source, a green light source, a blue light source and an infrared light source.

19. The system according to claim 1 wherein the processing module further comprises a frame grabber device that receives the at least one value from the camera, wherein the at least one value is a digital value representative of color intensity information.

20. A method of effectively sorting a group of different colored objects into separate groups of similar colored objects comprising:
   a. receiving an input feed having a plurality of objects;
   b. sorting the input feed at a plurality of first stage sorting devices into a plurality of first stage output feeds, wherein sorting occurs simultaneously for the input feeds;
   c. sorting at least one of the first stage output feeds at a second stage sorting device thereby forming a second output feed;
   d. sorting at least one of the first stage output feeds received directly from a corresponding one of the first stage sorting devices, and the second stage output feed, at a third stage sorting device, thereby forming a third stage output feed;
   e. transmitting at least one light through at least one object in a light sensing region;
   f. receiving the transmitted light utilizing a camera having a plurality of pixels;
   g. determining at least one light intensity value from the transmitted light in the light sensing region;
   h. generating a digital representation of the at least one light intensity value; and
   i. calculating a color value from the light intensity value.

21. The method according to claim 20 further comprising directing the at least one object to a path corresponding with the color value.

22. The method according to claim 20 further comprising providing the at least one object to the light sensing region.

23. The method according to claim 21 wherein the path deposits the at least one object into a corresponding container.

24. The method according to claim 20 wherein the at least one light includes a white light source.

25. The method according to claim 20 wherein the at least one light includes one or more of a red light emitting diode, a green light emitting diode, a blue light emitting diode and an infrared light source.

26. The method according to claim 20 further comprising receiving the light transmitted through the at least one object.

27. The method according to claim 26 wherein the received light is collected at a desired sampling interval.

28. The method according to claim 27 further comprising converting the at least one value into a digital representation value.

29. The method according to claim 28 further comprising calculating a non-linear function from at least one digital representation value.

30. The method according to claim 20 wherein the at least one light includes one or more of a red light source, a green light source, a blue light source and an infrared light source.

31. A multi-level sorting system for separating different colored cullet into cullet having substantially similar color characteristics comprising:
   a. a first means for sorting the cullets, wherein the first means for sorting directs the sorted cullets into more than two first output paths;
   b. a second means for further sorting at least one received first output path, wherein the second means for sorting directs the further sorted cullets into more than two second output paths;
   c. a third means for subsequently sorting at least one received first output path received directly from the first means for sorting, and at least one received second output path, wherein the third means for sorting directs the subsequently sorted cullets into more than two output paths, wherein the first means, the second means and the third means for sorting sort cullets simultaneously;
   d. means for transmitting at least one light through at least one cullet in a light sensing region;
   e. means for receiving the transmitted light, the means for receiving comprising a camera having a plurality of pixels positioned to receive the transmitted light transmitted from the means for transmitting;
   f. means for determining at least one light intensity value from the transmitted light in the light sensing region;
   g. means for calculating a color value from the at least one light intensity value; and
   h. means for directing the at least one cullet to a desired path based on the color value.

32. The system according to claim 31 wherein the means for calculating comprises a processing module that receives the at least one light intensity value, converts the at least one light intensity value to a digital representation that is used to calculate the color value.

* * * * *